Nov. 1, 1927.  
W. J. KNOLL  
STRIP CUTTER  
Filed July 24, 1926  
1,647,233  
2 Sheets-Sheet 1
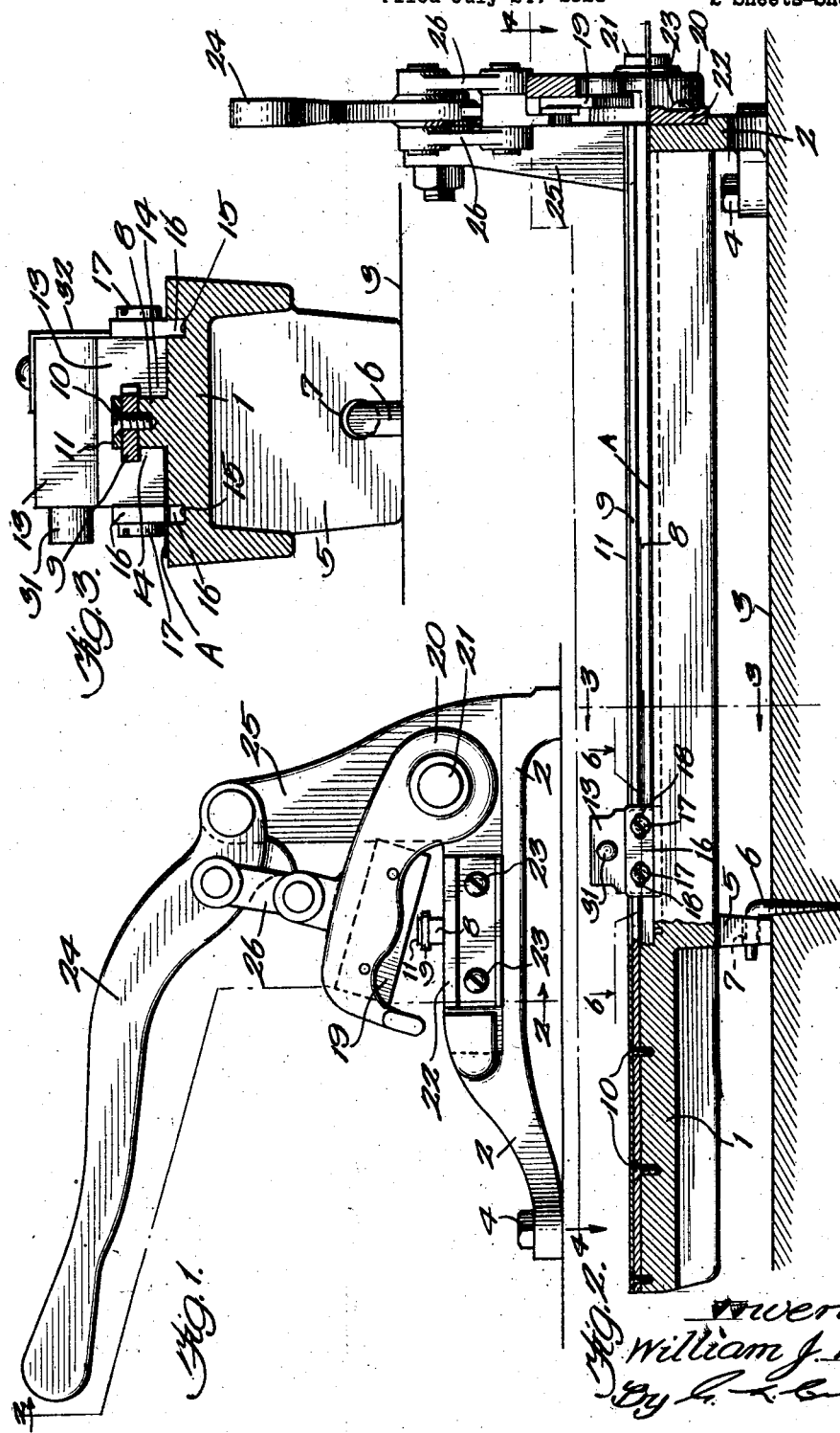
Inventor:  
William J. Knoll

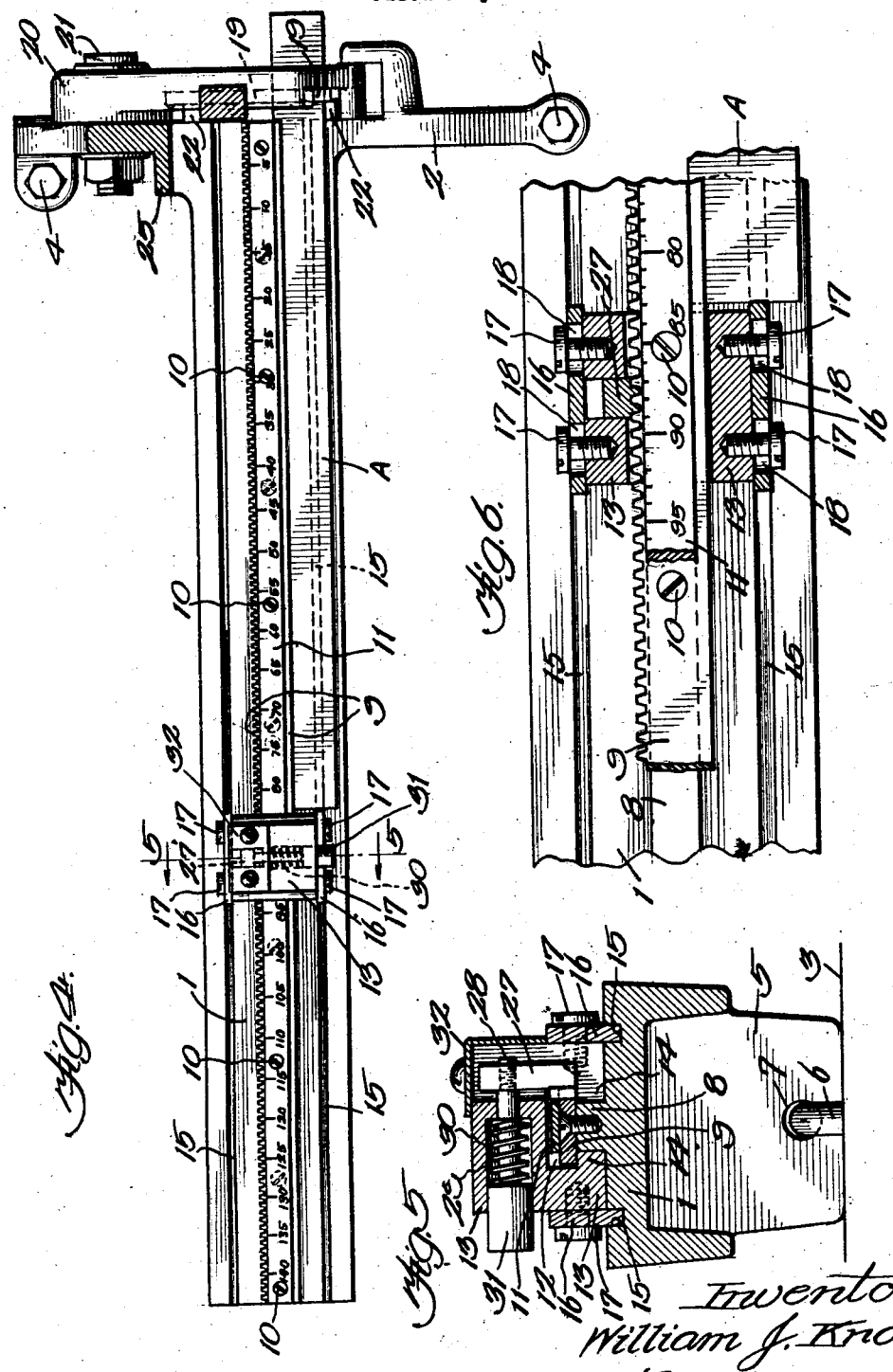

Patented Nov. 1, 1927.

1,647,233

UNITED STATES PATENT OFFICE.

WILLIAM J. KNOLL, OF CHICAGO, ILLINOIS, ASSIGNOR TO H. B. ROUSE & COMPANY, OF CHICAGO, ILLINOIS, A CORPORATION OF ILLINOIS.

STRIP CUTTER.

Application filed July 24, 1926. Serial No. 124,631.

My invention relates to strip cutters employed by printers and which are commonly known as lead and rule cutters.

The strip cutter of my invention includes a long and narrow body preferably formed of cast metal and having, in integral formation therewith, a longitudinal rib on its top side intermediate the longitudinal sides of said body, the top of said body having a groove on each side of and parallel with said rib and spaced apart therefrom, a portion upon the top of said rib and overhanging the sides thereof, a gauge block having a groove in its bottom side receiving said rib and overhanging portion and margined by inwardly extending ledges which are received between the top of said body and overhanging portion, said gauge block having gauge portions upon the sides thereof that enter the first aforesaid grooves, and a knife blade mounted to turn, at one end and one longitudinal side of said body, in a vertical plane and having its bottom edge constituting its cutting edge and movable to bring its cutting edge below the surfaces of the top of said body that are alongside said rib.

The rib is desirably rectangular in cross section and is machined upon its top and longitudinal sides. The top of the cast metal body is also machined on each side of said rib and the grooves on the top of said body are machined therein. The scale bearing portion is preferably in the form of a bar which is suitably secured upon the top of the rib and upon which the scale is provided, preferably by means of an additional strip which has the scale marks thereon. One longitudinal side of the scale bearing bar is desirably serrated for cooperation with a detent carried by the block and which detent is adjustable into and out of engagement with the serrations upon the scale bearing bar to hold the gauge block in selected adjustment. The gauge portions upon the gauge block are desirably in the form of plates which are secured upon the sides of the block and enter the corresponding grooves so that no strip which is being cut, no matter how thin, can be passed beyond the strip engaging ends of the employed gauge plates.

By means of the construction of my invention, the parts are very accurately formed, the machined sides of the rib being desirably employed as a gauge for defining the path of travel of the milling tool which is employed to machine the grooves in the top side of the cast metal body. Without this aid of the rib, the milling tool employed to form the grooves in the top of the cast metal body could not be confined with certainty to the proper lines of travel parallel to the rib.

The preferred form of invention is illustrated in the accompanying drawings in which Fig. 1 is an end view of a lead and rule cutter constructed in accordance with the invention; Fig. 2 is a sectional view on line 2—2 of Fig. 1; Fig. 3 is a sectional view on line 3—3 of Fig. 2; Fig. 4 is a sectional view on line 4—4 of Fig. 2; Fig. 5 is a sectional view on line 5—5 of Fig. 4; and Fig. 6 is a sectional view on line 6—6 of Fig. 2.

The machine includes a long and narrow cast metal body 1 which is of channel shape with the horizontal wall of the channel at the top, as illustrated most clearly in Figs. 3 and 5. This cast metal body has, in integral formation therewith and at one end thereof, laterally extending legs 2 which rest upon a suitable support 3, such as a table top, threaded bolts 4 passing through the feet of the legs and into said support. A third leg 5 is formed integrally with the cast metal body near the other end thereof, this third leg being held down upon the support 3 by means of a screw 6 having its upper end extending horizontally and passing through a hole 7 formed in the leg 5. By this construction, three points of support are afforded for the cast metal body whereby it rests firmly upon the support 3. A rib 8 is formed integrally with the cast metal body, this rib extending longitudinally upon the body, intermediate longitudinal sides thereof. The rib is rectangular in cross section and is machined upon its top and longitudinal sides. A bar 9 is secured upon the top of the rib by means of the screws 10. The scale is desirably provided upon a metal strip 11 which is clamped by the heads of the screws 10 against the top of the bar 9 though the invention is not to be limited to providing the scale upon the scale bearing strip. The scale bearing bar 9 overhangs the longitudinal side of the rib 8 so as to form, with said rib, a retaining tongue which is received in groove 12 formed in the bottom of the gauge block 13, this gauge block being margined by inwardly extending ledges 14 which are received between the overhanging portions of the bar 9 and the top portions of the cast metal body 1 that are upon each side of the rib. The top of the cast metal body 1 is machined on each side of the rib and a groove 15 is machined on each side of and parallel with the rib, the machined sides of the rib being employed to guide the groove forming tools employed to form the grooves 15. By this construction, the gauge block is accurately positioned in each of its adjustments effected by moving it longitudinally of the body 1. The strip metal A to be cut is placed upon the top portions of the cast metal body 1 and alongside of the rib 8. The metal is accurately positioned by means of gauge plates 16 which are secured upon the sides of the gauge block, each by means of two screws 17. The gauge plates or portions 16 are freely received in the grooves 15 so as to extend below the top of the cast metal body 1 to prevent any strip material, however thin, from being moved beyond the strip engaging ends of the gauge plates. That is, the strip material being cut is prevented from finding entry to extend beyond the gauge plates and the underlying portion of the cast metal body 1. The gauge plates are desirably provided with longitudinal slots 18 which receive the shanks of the screws 17. When these screws are loosened, the plates may be adjusted longitudinally to exactly the desired position whereafter the plates are held in their adjustments by tightening the screws.

The knife for cutting the strips is provided at one end of the cast metal body, this knife including a knife blade 19 which is mounted upon an arm 20, this arm being journaled upon a shaft 21 carried by and projecting from one end of the cast metal body 1. The knife blade 19 and its supporting arm 20 are so located that the bottom edge of the knife blade, which constitutes the cutting edge thereof, may be brought below the surfaces of the cast metal body 1 that are alongside of the rib 8 so that the strip metal interposed between the top of the body 1 and the knife may be sheared. In the preferred embodiment of the invention, a shearing block 22 cooperates with the knife blade 19, this shearing block being secured upon the outer end of the cast metal block by means of screws 23. A hand lever 24 is pivoted upon a bracket 25 upon which the arm 20 is also pivoted. A toggle link 26 unites the handle, adjacent its pivoted end, with the arm 20, the knife being thus operated through the intermediation of said toggle link. The gauge block 13 is desirably positioned by means of a detent 27 carried by the gauge block and receivable between selected serrations formed in one longitudinal side of the scale bearing bar 9. The detent 27 is carried upon a reciprocating rod 28 which projects from the gauge block at one end and is received in a recess 29 at its other end. A coiled spring 30 surrounds the rod 29 and presses, at one end, against the rod enlargement 31, constituting a thumb piece, and at its other end, against the gauge block. The spring serves to bring the detent 27 between selected serrations on the scale bearing bar 9 whereby the gauge block is held in a position which corresponds to the length of the strip that is to be cut. A shield 32 is carried by the gauge block and serves to limit the extent to which the detent may be outwardly thrust when being disengaged from the scale bearing bar.

Changes may be made without departing from the invention.

Having thus described my invention, I claim:

1. A strip cutter including a long and narrow cast metal body having, in integral formation therewith, a longitudinal rib on its top side intermediate the longitudinal sides of said body, said rib being rectangular in cross section and machined upon its top and longitudinal sides, the top of said body being also machined on each side of said rib and having a groove machined therein on each side of and parallel with said rib and spaced apart therefrom; a scale bearing bar secured upon the top of said rib and overhanging the sides thereof and having one of its longitudinal sides serrated; a gauge block having a groove in its bottom side receiving said rib and scale bearing bar and margined by inwardly extending ledges which are received between the top of said body and the overhanging portions of said scale bearing bar; gauge plates secured upon the sides of said gauge block and entering the first aforesaid grooves, these plates being adjustable on said gauge block longitudinally of the aforesaid cast metal body; a detent carried by the gauge block and adjustable into and out of engagement with the serrations upon the scale bearing bar; and a knife blade mounted to turn in a vertical plane, the place of mounting for the knife blade being at one end and upon one side of said cast metal body, said knife blade having its bottom edge constituting its cutting edge and being movable to bring its cutting edge below the surfaces of the top of the cast metal body that are alongside said rib.

2. A strip cutter including a long and narrow cast metal body having, in integral formation therewith, a longitudinal rib on its top side intermediate the longitudinal sides of said body, said rib being rectangular in cross section and machined upon its top and longitudinal sides, the top of said body being also machined on each side of said rib and having a groove machined therein on each side of and parallel with said rib and spaced apart therefrom; a scale bearing bar secured upon the top of said rib and overhanging the sides thereof and having one of its longitudinal sides serrated; a gauge block having a groove in its bottom side receiving said rib and scale bearing bar and margined by inwardly extending ledges which are received between the top of said body and the overhanging portions of said scale bearing bar; gauge plates secured upon the sides of said gauge block and entering the first aforesaid grooves; a detent carried by the gauge block and adjustable into and out of engagement with the serrations upon the scale bearing bar; and a knife blade mounted to turn in a vertical plane, the place of mounting for the knife blade being at one end and upon one side of said cast metal body, said knife blade having its bottom edge constituting its cutting edge and being movable to bring its cutting edge below the surfaces of the top of the cast metal body that are alongside said rib.

3. A strip cutter including a long and narrow cast metal body having, in integral formation therewith, a longitudinal rib on its top side intermediate the longitudinal sides of said body, said rib being machined upon its longitudinal sides, the top of said body being also machined on each side of said rib and having a groove machined therein on each side of and parallel with said rib and spaced apart therefrom; a scale bearing portion upon the top of said rib and overhanging the sides thereof and having one of its longitudinal sides serrated; a gauge block having a groove in its bottom side receiving said rib and scale bearing portion and margined by inwardly extending ledges which are received between the top of said body and the overhanging portions of said scale bearing portion; gauge plates secured upon the sides of said gauge block and entering the first aforesaid grooves, these plates being adjustable on said gauge block longitudinally of the aforesaid cast metal body; a detent carried by the gauge block and adjustable into and out of engagement with the serrations upon the scale bearing portion; and a knife blade mounted to turn in a vertical plane, the place of mounting for the knife blade being at one end and upon one side of said cast metal body, said knife blade having its bottom edge constituting its cutting edge and being movable to bring its cutting edge below the surfaces of the top of the cast metal body that are alongside said rib.

4. A strip cutter including a long and narrow cast metal body having, in integral formation therewith, a longitudinal rib on its top side intermediate the longitudinal sides of said body, said rib being machined upon its longitudinal sides, the top of said body being also machined on each side of said rib and having a groove machined therein on each side of and parallel with said rib and spaced apart therefrom; a scale bearing portion upon the top of said rib and overhanging the sides thereof and having one of its longitudinal sides serrated; a gauge block having a groove in its bottom side receiving said rib and scale bearing portion and margined by inwardly extending ledges which are received between the top of said body and the overhanging portions of said scale bearing portion; gauge plates secured upon the sides of said gauge block and entering the first aforesaid grooves; a detent carried by the gauge block and adjustable into and out of engagement with the serrations upon the scale bearing portion; and a knife blade mounted to turn in a vertical plane, the place of mounting for the knife blade being at one end and upon one side of said cast metal body, said knife blade having its bottom edge constituting its cutting edge and being movable to bring its cutting edge below the surfaces of the top of the cast metal body that are alongside said rib.

5. A strip cutter including a long and narrow cast metal body having, in integral formation therewith; a longitudinal rib on its top side intermediate the longitudinal sides of said body, said rib being rectangular in cross section and machined upon its top and longitudinal sides, the top of said body being also machined on each side of said rib and having a groove machined therein on each side of and parallel with said rib and spaced apart therefrom; a scale bearing bar secured upon the top of said rib and overhanging the sides thereof and having one of its longitudinal sides serrated; a gauge block having a groove in its bottom side receiving said rib and scale bearing bar and margined by inwardly extending ledges which are received between the top of said body and the overhanging portions of said scale bearing bar, said gauge block having gauge portions upon the sides thereof that enter the first aforesaid grooves; a detent carried by the gauge block and adjustable into and out of engagement with the serrations upon the scale bearing bar; and a knife blade mounted to turn in a vertical plane, the place of mounting for the knife blade being at one end and upon one side of said cast metal body, said knife blade having its bottom edge constituting its cutting edge and being movable to bring its cutting edge below the surfaces of the top of the cast metal body that are alongside said rib.

6. A strip cutter including a long and narrow cast metal body having, in integral formation therewith, a longitudinal rib on its top side intermediate the longitudinal sides of said body, said rib being machined upon its longitudinal sides, the top of said body being also machined on each side of said rib and having a groove machined therein on each side of and parallel with said rib and spaced apart therefrom; a scale bearing portion upon the top of said rib and overhanging the sides thereof and having one of its longitudinal sides serrated; a gauge block having a groove in its bottom side receiving said rib and scale bearing portion and margined by inwardly extending ledges which are received between the top of said body and the overhanging portions of said scale bearing portion, said gauge block having gauge portions upon the sides thereof that enter the first aforesaid grooves; a detent carried by the gauge block and adjustable into and out of engagement with the serrations upon the scale bearing portion; and a knife blade mounted to turn in a vertical plane, the place of mounting for the knife blade being at one end and upon one side of said cast metal body, said knife blade having its bottom edge constituting its cutting edge and being movable to bring its cutting edge below the surfaces of the top of the cast metal body that are alongside said rib.

7. A strip cutter including a long and narrow cast metal body having, in integral formation therewith, a longitudinal rib on its top side intermediate the longitudinal sides of said body, the top of said body having a groove on each side of and parallel with said rib and spaced apart therefrom; a scale bearing portion upon the top of said rib and overhanging the sides thereof and having one of its longitudinal sides serrated; a gauge block having a groove in its bottom side receiving said rib and overhanging portion and margined by inwardly extending ledges which are received between the top of said body and the overhanging portion, said gauge block having gauge portions upon the sides thereof that enter the first aforesaid grooves; a detent carried by the gauge block and adjustable into and out of engagement with the serrations upon the scale bearing portion; and a knife blade mounted to turn in a vertical plane, the place of mounting for the knife blade being at one end and upon one side of said cast metal body, said knife blade having its bottom edge constituting its cutting edge and being movable to bring its cutting edge below the surfaces of the top of the cast metal body that are alongside said rib.

8. A strip cutter including a long and narrow body having, in integral formation therewith, a longitudinal rib on its top side intermediate the longitudinal sides of said body, the top of said body having a groove on each side of and parallel with said rib and spaced apart therefrom; a portion upon the top of said rib and overhanging the sides thereof; a gauge block having a groove in its bottom side receiving said rib and overhanging portion and margined by inwardly extending ledges which are received between the top of said body and overhanging portion, said gauge block having gauge portions upon the sides thereof that enter the first aforesaid grooves; and a knife blade mounted to turn in a vertical plane, the place of mounting for the knife blade being at one end and upon one side of said body, said knife blade having its bottom edge constituting its cutting edge and being movable to bring its cutting edge below the surfaces of the top of said body that are alongside said rib.

9. A strip cutter including a long and narrow body having a longitudinal rib on its top side, the top of said body having a groove parallel with said rib and spaced apart therefrom; a portion upon the top of said rib and overhanging a side thereof; a gauge block having a groove in its bottom side receiving said rib and overhanging portion and having a portion received between the top of said body and overhanging portion, said gauge block having a gauge portion upon a side thereof that enters the first aforesaid groove; and a knife blade mounted to turn in a vertical plane, the place of mounting for the knife blade being at one end of said body.

In witness whereof, I hereunto subscribe my name.

WILLIAM J. KNOLL.